United States Patent
Meng

(10) Patent No.: US 10,901,270 B2
(45) Date of Patent: Jan. 26, 2021

(54) MANUFACTURING METHOD FOR PIXEL ELECTRODE, PIXEL ELECTRODE AND DISPLAY PANEL

(71) Applicant: TCL China Star Optoelectronics Technology Co., Ltd., Guangdong (CN)

(72) Inventor: Xiaolong Meng, Shenzhen (CN)

(73) Assignee: TCL CHINA STAR OPTOELECTRONICS TECHNOLOGY CO., LTD., Guangdong (CN)

(*) Notice: Subject to any disclaimer, the term of this patent is extended or adjusted under 35 U.S.C. 154(b) by 0 days.

(21) Appl. No.: 16/784,263

(22) Filed: Feb. 7, 2020

(65) Prior Publication Data

US 2020/0174296 A1 Jun. 4, 2020

Related U.S. Application Data

(62) Division of application No. 16/139,206, filed on Sep. 24, 2018, now Pat. No. 10,620,486.

(30) Foreign Application Priority Data

May 24, 2018 (CN) .......................... 2018 1 0507408

(51) Int. Cl.
G02F 1/1343 (2006.01)

(52) U.S. Cl.
CPC ........ *G02F 1/1343* (2013.01); *G02F 1/13439* (2013.01); *G02F 2201/123* (2013.01)

(58) Field of Classification Search
CPC ............ G02F 1/1343; G02F 1/134363; G02F 1/134309; G02F 1/13439; G02F 1/133707; G02F 2201/123
See application file for complete search history.

(56) References Cited

U.S. PATENT DOCUMENTS

| | | | |
|---|---|---|---|
| 6,852,566 B2 | 2/2005 | Yaung | |
| 2001/0005597 A1 | 6/2001 | Shin | |

(Continued)

FOREIGN PATENT DOCUMENTS

| | | |
|---|---|---|
| CN | 1549004 A | 11/2004 |
| CN | 105633016 A | 6/2016 |

(Continued)

*Primary Examiner* — Thoi V Duong
(74) *Attorney, Agent, or Firm* — Leong C. Lei

(57) ABSTRACT

A manufacturing method for pixel electrode is disclosed. The preparation method is simple and efficient, low in cost, and can be used for large-scale industrial production. The present also provides a pixel electrode including a substrate, and multiple branch electrodes disposed on a pixel region of the substrate; wherein the multiple branch electrodes includes a first branch electrode and a second branch electrode which are alternately spaced, the first branch electrode includes a first transparent conductive layer and a first transparent metal oxide layer which are sequentially stacked on the substrate, the second electrode includes a second transparent conductive layer and a second transparent metal oxide layer which are sequentially stacked on the substrate. The pixel electrode has high transmittance and high resolution. The invention also provides a display panel.

3 Claims, 4 Drawing Sheets

(56) References Cited

U.S. PATENT DOCUMENTS

2004/0227875 A1* 11/2004 Park .................. G02F 1/134363
 349/113
2006/0220018 A1* 10/2006 Ahn .................. G02F 1/134363
 257/59
2018/0045998 A1*  2/2018 Ye .................... G02F 1/134309

FOREIGN PATENT DOCUMENTS

| CN | 107768386 A | 3/2018 |
|---|---|---|
| JP | 2008145577 A | 6/2008 |

* cited by examiner

MANUFACTURING METHOD FOR PIXEL ELECTRODE, PIXEL ELECTRODE AND DISPLAY PANEL

CROSS-REFERENCE TO RELATED APPLICATION

This is a divisional application of co-pending U.S. patent application Ser. No. 16/139,206, filed on Sep. 24, 2018, which is a continuation application of PCT Patent Application No. PCT/CN2018/097264 filed on Jul. 26, 2018, which claims the priority benefit of Chinese Patent Application No. 201810507408.6, filed on May 24, 2018, which is herein incorporated by reference in its entirety.

FIELD OF THE INVENTION

The present invention relates to a display technology field, and more particularly to a manufacturing method for pixel electrode, pixel electrode and display panel.

BACKGROUND OF THE INVENTION

With the increasing application of Thin Film Transistor Liquid Crystal Display (TFT-LCD), the display effect requirements (such as resolution) of liquid crystal displays are also increasing. Among them, the transmittance and resolution of the pixel electrode have an important influence on the display effect of the liquid crystal display.

Limited by the device (such as the resolution of the exposure machine, the resolution of the photoresist), the width of the branch electrode (Line) in the structure of the pixel electrode such as the RGB stripe arrangement prepared by the conventional process, and the width of the interval (Space) between the branch electrodes are limited. The current mainstream design can only achieve Line/Space between 4/2 µm and 3/3 µm, which makes the overall transmittance and resolution of the pixel electrode cannot be further improved, which seriously limit improvement of the high resolution and high quality display of liquid crystal display. However, the use of higher resolution exposure machines and higher resolution photoresists two greatly increases production costs and does not allow for mass production.

Therefore, it is necessary to propose a method of preparing a pixel electrode to improve the transmittance of the pixel electrode.

SUMMARY OF THE INVENTION

Accordingly, the present invention provides a manufacturing method for pixel electrode, a pixel electrode and a display panel. The manufacturing method is simple, efficient, and low in cost, and the manufactured pixel electrode has high transmittance and high resolution.

In a first aspect, the present invention provides a manufacturing method for pixel electrode, comprising steps of: providing a substrate, and sequentially depositing a transparent conductive layer and a metal film layer on the substrate; coating a photoresist material on the metal thin-film layer, patterning and forming multiple first photoresist layers and multiple second photoresist layers disposed alternately and sequentially in a pixel region, a thickness of the first photoresist layer is less than a thickness of the second photoresist layer, and etching the metal thin-film layer and the transparent conductive layer at a non-pixel region to expose the substrate; ashing the first photoresist layer and the second photoresist layer to remove the first photoresist layer, and oxidizing the metal thin-film layer covered by the first photoresist layer to form a first transparent metal oxide layer; partially ashing the second photoresist layer such that two ends of the second photoresist layer are decreased by a distance X to partially expose the metal thin-film layer, etching the metal thin-film layer which is partially exposed and the transparent conductive layer located below such that the transparent conductive layer forms a first transparent conductive layer and a second transparent conductive layer which are alternately spaced, the first transparent conductive layer and the first transparent metal oxide layer form a first branch electrode; and stripping the second photoresist layer which is partially ashed, and oxidizing the exposed metal thin-film layer to form a second transparent metal oxide layer, the second transparent conductive layer and the second transparent metal oxide layer form a second branch electrode, and the first branch electrode and the second branch electrode are alternately spaced, and a width between the first branch electrode and the second branch electrode is the distance X.

Optionally, the step of coating a photoresist material on the metal thin-film layer, patterning and forming multiple first photoresist layers and multiple second photoresist layers disposed alternately and sequentially in a pixel region further comprises a step of: forming a third photoresist layer, ashing the third photoresist layer and etching to form a pixel frame structure and/or a pixel trunk structure.

Optionally, a width of the first branch electrode and a width of the second branch electrode are the same.

Optionally, a cross-sectional shape of each of the first branch electrode and the second branch electrode includes a rectangle and a parallelogram.

Optionally, a material of the transparent conductive layer includes one or more of indium tin oxide (ITO), indium zinc oxide (IZO), aluminum zinc oxide (AZO), and indium gallium zinc oxide (IGZO).

Optionally, a material of the metal thin-film layer includes aluminum (Al).

Optionally, the distance X is 0.2 µm~10 µm.

In the manufacturing method for a pixel electrode according to the first aspect of the present invention, multiple first photoresist layers and multiple second photoresist layers are sequentially formed by adding a metal thin-film layer and patterned by a mask patterning. The first photoresist layer and the second photoresist layer are ashed, and a pixel electrode including the first branch electrode and the second branch electrode which are alternately spaced apart is formed in the pixel region of the substrate through an oxidation and etching process. The manufacturing method is simple and efficient, low in cost, and can be used for large-scale industrial production; the pixel electrode prepared by the present invention method has high transmittance and high resolution. According to the manufacturing method of the present invention, the width of the branch electrode in the pixel electrode can be up to the order of micrometers (for example, 1 micrometer) or even nanometer, and the pixel electrode has high transmittance and high resolution.

In a second aspect, the present invention further provides a pixel electrode, comprising: a substrate; and multiple branch electrodes disposed on a pixel region of the substrate; wherein the multiple branch electrodes includes a first branch electrode and a second branch electrode which are alternately spaced, the first branch electrode includes a first transparent conductive layer and a first transparent metal oxide layer which are sequentially stacked on the substrate, the second electrode includes a second transparent conductive layer and a second transparent metal oxide layer which are sequentially stacked on the substrate.

Optionally, a width between the first branch electrode and the second branch electrode is a distance X.

Optionally, the distance X is 0.2 μm~10 μm.

Optionally, the pixel electrode further includes a pixel frame structure and/or a pixel trunk structure, the first branch electrode is connected to the pixel frame structure and/or the pixel trunk structure, and the second branch electrode is connected to the pixel frame structure and/or the pixel trunk structure.

In a third aspect, the present invention also provides a display panel, including a pixel electrode manufactured by the manufacturing method in the first aspect of the present invention. The display panel further includes a backlight module, a TFT array substrate and a color filter substrate.

The advantages of the present invention will be partially explained in the following description. A part of this is obvious from the description or can be understood by the implementation of the embodiments of the invention.

DETAILED DESCRIPTION OF PREFERRED EMBODIMENTS

The following is a preferred embodiment of the embodiments of the present invention, and it should be noted that one of ordinary skill in the art will recognize that a number of modifications and refinements can also be made without departing from the principles of the embodiments of the present invention. These improvements and modifications are also considered to be within the scope of the embodiments of the present invention.

In the specification, claims, and accompanying drawings of the present disclosure, the terms "include", "contain" and any other variants mean to cover the non-exclusive inclusion, for example, a process, method, system, product, or device that includes a list of steps or units is not necessarily limited to those units, but may include other steps or units not expressly listed or inherent to such a process, method, system, product, or device. Besides, the terms "first", "second", "third", and so on are intended to distinguish between similar objects but do not necessarily indicate a specific order or sequence.

Figure 1:
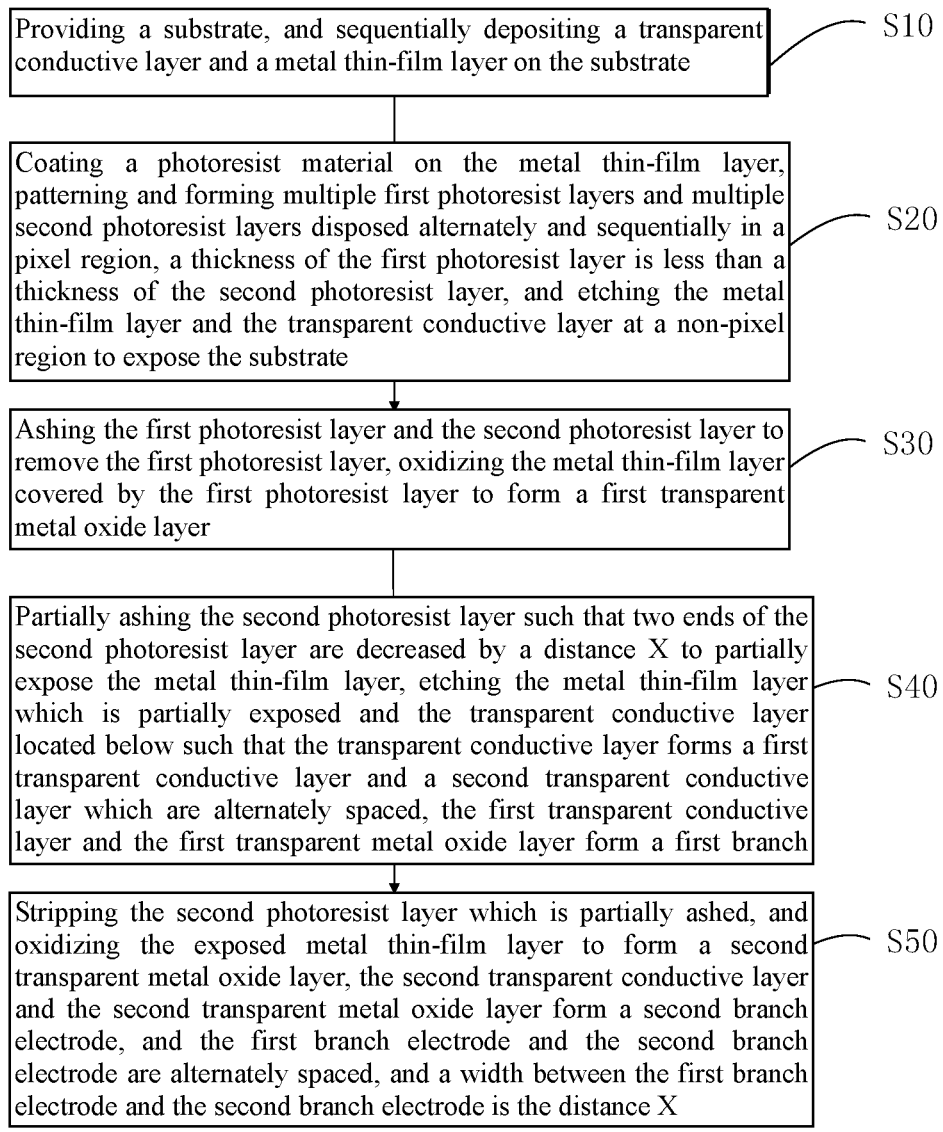
FIG. 1 is a flow chart of a process for manufacturing a pixel electrode according to an embodiment of the invention.
Figure 2:
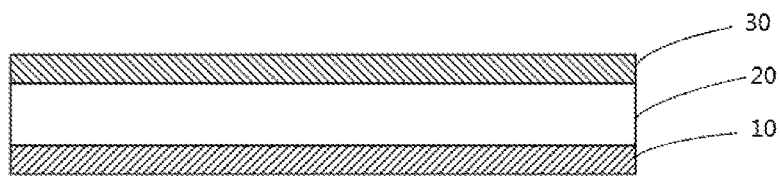
FIG. 2 is a schematic diagram of a step S10 of a manufacturing method for pixel electrode according to an embodiment of the present invention.

Referring to FIG. 1, an embodiment of the present invention provides a manufacturing method, including:

S10, as shown in FIG. 2, providing a substrate 10, and sequentially depositing a transparent conductive layer 20 and a metal thin-film layer 30 on the substrate 10;

S20, coating a photoresist material on the metal thin-film layer 20, patterning and forming multiple first photoresist layers 401 and multiple second photoresist layers 402 disposed alternately and sequentially in a pixel region. A thickness of the first photoresist layer 401 is less than a thickness of the second photoresist layer 402, and etching the metal thin-film layer 30 and the transparent conductive layer 20 at a non-pixel region to expose the substrate 10, referring to FIG. 3 and FIG. 4 together.

Figure 5:
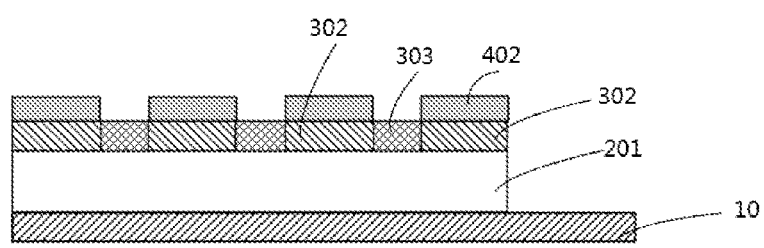
FIG. 5 is a schematic diagram of a step S30 of a manufacturing method for pixel electrode according to an embodiment of the present invention.
Figure 6:
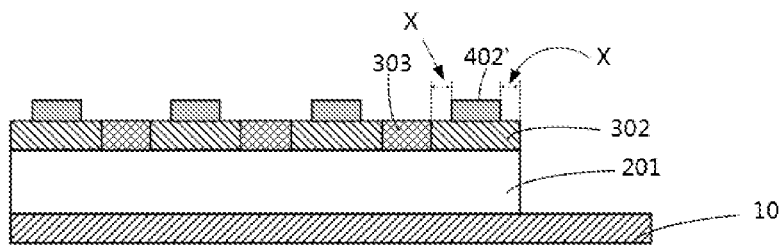
FIG. 6 is a schematic diagram of a step S40 of a manufacturing method for pixel electrode according to an embodiment of the present invention.
Figure 7:
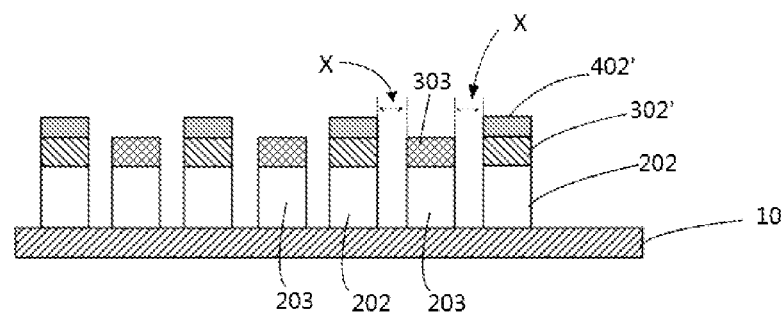
FIG. 7 is a schematic diagram of a step S40 of a manufacturing method for pixel electrode according to an embodiment of the present invention.

S30, ashing the first photoresist layer 401 and the second photoresist layer 402 to remove the first photoresist layer 401. As shown in FIG. 5, oxidizing the metal thin-film layer 301 covered by the first photoresist layer 401 to form a first transparent metal oxide layer 303;

S40, referring to FIG. 6 and FIG. 7 together, partially ashing the second photoresist layer 402 such that two ends of the second photoresist layer 402 are decreased by a distance X to partially expose the metal thin-film layer 302. Etching the metal thin-film layer 302 which is partially exposed and the transparent conductive layer 201 located below such that the transparent conductive layer 201 forms a first transparent conductive layer 203 and a second transparent conductive layer 202 which are alternately spaced, the first transparent conductive layer 203 and the first transparent metal oxide layer 303 form a first branch electrode.

Figure 8:
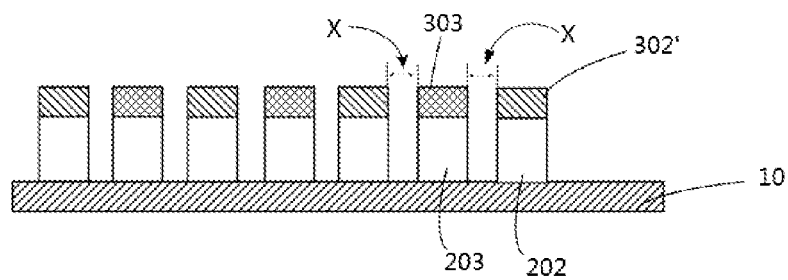
FIG. 8 is a schematic diagram of a step S50 of a manufacturing method for pixel electrode according to an embodiment of the present invention.
Figure 9:
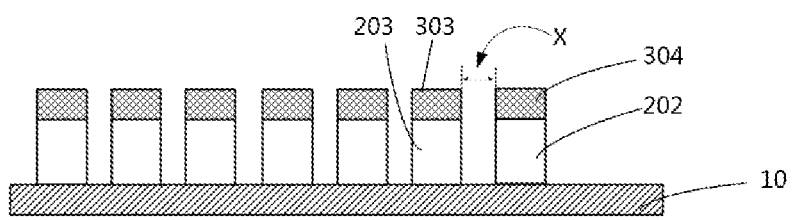
FIG. 9 is a schematic diagram of a step S50 of a manufacturing method for pixel electrode according to an embodiment of the present invention.

S50, referring to FIG. 8 and FIG. 9 together, stripping the second photoresist layer 402' which is partially ashed, and oxidizing the exposed metal thin-film layer 302' to form a second transparent metal oxide layer 304, the second transparent conductive layer 202 and the second transparent metal oxide layer 304 form a second branch electrode, and the first branch electrode and the second branch electrode are alternately spaced, and a width between the first branch electrode and the second branch electrode is the distance X.

In the S10, as shown in FIG. 2, the substrate 10 includes a TFT array board or other panel that needs to be assembled with a pixel electrode. In this embodiment, the substrate 10 includes a pixel region and a non-pixel region; the pixel region is used to prepare and form a pixel electrode. The material of the transparent conductive layer 20 includes one or more of indium tin oxide (ITO), indium zinc oxide (IZO), aluminum zinc oxide (AZO), and indium gallium zinc oxide (IGZO). Optionally, the metal thin-film layer is made of a metal that can be oxidized to form a transparent metal oxide. Specifically, the material of the metal thin-film layer 30 includes, but is not limited to, aluminum (Al). Optionally, the substrate 10 comprises a TFT array substrate or other panel substrate.

In the embodiment, a thickness of the metal thin-film layer 30 is 1 nm-1000 nm. Further optionally, the thickness the metal thin-film layer 30 is 1 nm-800 nm. Preferably, the thickness of the metal thin-film layer 30 is 10 nm to 600 nm. For example, the thickness of the metal thin-film layer 30 is 10 nm, 50 nm, 80 nm, 200 nm, or 500 nm or the like.

Figure 3:
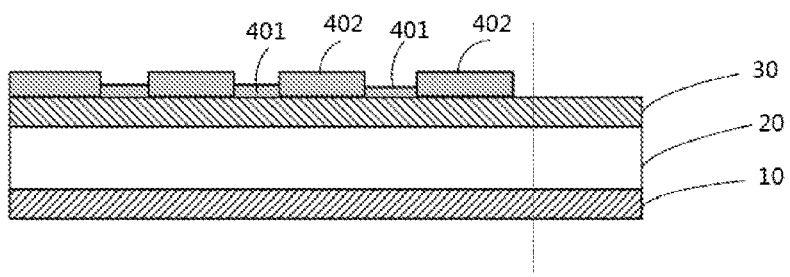
FIG. 3 is a schematic diagram of a step S20 of a manufacturing method for pixel electrode according to an embodiment of the present invention.
Figure 4:
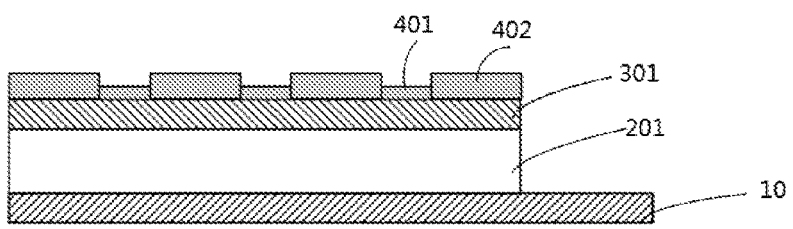
FIG. 4 is a schematic diagram of a step S20 of a manufacturing method for pixel electrode according to an embodiment of the present invention.

Wherein, in the step S20, as shown in FIG. 3, the pixel region of the substrate 10 may be a left side portion of a broken line, and the non-pixel area is at a right side portion of the broken line. Using a different grayscale mask process, such as coating, exposure, development, etching and stripping steps to form a first photoresist layer 401 and a second photoresist layer 402 having different thickness distribution in the pixel region of the substrate 10; Then, using a wet etching or a dry etching to etch away the metal thin-film layer 30 (see FIG. 3) and the transparent conductive layer 20 (see FIG. 3) at the non-pixel region of the substrate 10, and reserve the metal thin-film layer 301 (see FIG. 4), the transparent conductive layer 302 (see FIG. 4), the first photoresist layer 401, and the second photoresist layer 402 in the pixel region. Optionally, the photoresist material comprises a resin, a sensitizer, and a solvent. The first photoresist layer 401 and the second photoresist layer 402 are sequentially and alternately arranged in sequence.

In this embodiment, the widths of the first photoresist layer 401 and the second photoresist layer 402 can be adjusted by a photomask process. By patterning a photoresist material coated on the metal thin-film layer 30, a third photoresist layer may be formed in the pixel region of the metal thin-film layer 30, the third photoresist layer is ashed, and part of the metal thin-film layer 30 and the transparent conductive layer 20 are etched away simultaneously in order to form a pixel frame structure and/or a pixel trunk structure. The pixel frame structure and/or the pixel trunk structure may form various patterns to improve the conductivity of the entire pixel electrode and improve the display effect of the entire pixel electrode.

In the S30, after the first photoresist layer 401 is ashed, the metal thin-film layer 301 covered by the first photoresist layer 401 is exposed, and oxygen (02) or other means is used such that the exposed portion of the metal thin-film layer 301 is oxidized to form multiple first transparent metal oxide layers 303. Wherein, after the multiple partial regions of the metal thin-film layer 301 are exposed and oxidized, a second metal thin-film layer 302 and a first transparent metal oxide layer 303 which are alternately spaced are obtained, see FIG. 5. Optionally, the ashing process may be an overall ashing, since the thickness of the first photoresist layer 401 is less than the thickness of the second photoresist layer 402; when the first photoresist layer 401 is ashed, the second photoresist layer 402 is reserved.

In this embodiment, the first transparent metal oxide layer has a high transmittance, which will not cause a large loss of light intensity, and has little influence on the optical path. Since the first transparent metal oxide layer is directly below the first photoresist layer that is ashed, the first transparent metal oxide layer is also a correspondingly regular distribution.

Wherein, in the S40, as shown in FIG. 6, the partial ashing process is also an overall ashing of all the multiple distributed second photoresist layers 402, so that two ends of the second photoresist layer 402 are shortened, and the thickness of the second photoresist layer 402 is also correspondingly reduced. The shortened size of the two ends of the second photoresist layer 402 can be controlled by adjusting the ashing process parameters. In particular, the shortened size of the two ends of the second photoresist layer 402 can achieve micron level or even nanoscale. When the two ends of the second photoresist layer 402 are shortened and a partially ashed, the second photoresist layer 402' having a reduced thickness and width is formed, the partially ashed second photoresist layer 402' will correspondingly expose the second metal thin-film layer 302 disposed directly below, etching the exposed second metal thin-film layer 302 by wet etching or other processes to obtain the etched second metal thin-film layer 302', and continuing to etch the exposed transparent conductive layer 201 to form a slit-like space, see also FIG. 6 and FIG. 7.

After the etching is completed, the interval divides the original transparent conductive layer 201 into the first transparent conductive layer 203 and the second transparent conductive layer 202 which are alternately spaced; wherein the first transparent conductive layer 203 is covered with the first transparent metal oxide layer 303, the second transparent conductive layer 202 is provided with an etched second metal thin-film layer 302' and a partially ashed second photoresist layer 402'. Optionally, the interval between the first transparent conductive layer 203 and the second transparent conductive layer 202 is a distance X shortened by any one of the two ends of the partially etched second photoresist layer 402'. Optionally, the distance X has a width of 0.2 μm-10 μm.

Furthermore, optionally, a width of the distance X is 0.2 μm~2.5 μm. Preferably, the width of the distance X is 0.5 μm~2 μm. In the embodiment, the width of the distance X may be less than 2 μm. For example, the width of the distance X is 0.8 μm, 1 μm, 1.5 μm, 2 μm, 2.5 μm or 3 μm. When the distance between any of the two ends of the partially etched second photoresist layer 402' is shortened by 1 μm, the interval between the first transparent conductive layer and the second transparent conductive layer which are alternately disposed is also 1 μm. The interval of the first transparent conductive layer 203 and the second transparent conductive layer 202 can be adjusted by adjusting the distance X shortened by any of the two ends of the partially etched second photoresist layer 402'.

In this embodiment, the width (Line, L) of the first branch electrode or the second branch electrode is not excessively limited, and the size of the width is adjusted according to the size of the pixel electrode, the number of the first or second branch electrodes can also be adjusted. The width (Space, S) of the interval between the first electrode and the second electrode (the width of the interval is the same as the width of the distance X) can also be adjusted. In the liquid crystal display panel, as the L/S decreases, the electric field at the edge of the branch electrode increases, the liquid crystal deflection uniformity in the same direction is enhanced, and the direction of the liquid crystal deflected by the electric field is enhanced, thereby improving the control force of the electric field on the liquid crystal, eventually improve the transmittance.

The manufacturing method of the present embodiment can shorten the size of the two ends of the second photoresist layer 402 to a micron level or even a nanometer level, and the width of the first electrode and the second electrode reach the micron level. The nanometer level makes the entire pixel electrode have high transmittance and high resolution, which improves the display effect of the entire display panel. The preparation method of the present embodiment is low in cost, simple and easy to operate, and the instrument and equipment used can be conventional equipment in the prior art; however, the prior art method cannot be obtained in the present embodiment by conventional low-cost conventional equipment. The pixel electrode has a width having a very small interval.

In the embodiment, in the process of etching the partially exposed metal thin-film layer 302 and the transparent conductive layer 201, an etchant is used to firstly etch the partially exposed metal thin-film layer 302. The etchant does not act on the metal oxide, but acts on the partially exposed metal thin-film layer 302, that is, the etchant does not etch the first transparent metal oxide layer 303.

In the S50, after stripping the second photoresist layer 402' after being ashed, oxidizing the etched second metal thin film layer 302' in order to obtain the second transparent metal oxide layer 304, see also FIG. 8 and FIG. 9.

In this embodiment, the alternately spaced arrangement form of the first branch electrode and the second branch electrode can be written as A-B-A-B-A-B . . . , ie, (AB)n, where n is an integer greater than or equal to 1. A represents the first electrode and B represents the second electrode. The alternately spaced arrangement form of the first branch electrode and the second branch electrode can also be written as A-B-A-B-A-B . . . A, ie, (AB)nA, where n is an integer greater than or equal to 1, and A represents One electrode, B represents the second electrode.

Figure 10:
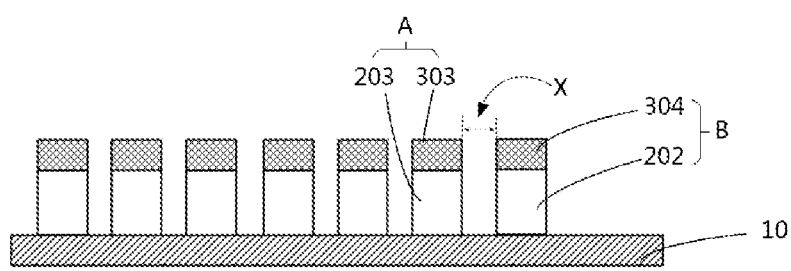
FIG. 10 is a schematic structural diagram of a pixel electrode according to another embodiment of the present invention.

The present invention also provides a pixel electrode, as shown in FIG. 10, comprising a substrate 10, and multiple branch electrodes disposed on a pixel region of the substrate 10. The multiple branch electrodes includes a first branch electrode A and a second branch electrode B which are alternately spaced, and the first branch electrode A includes a first transparent conductive layer 203 and a first transparent metal oxide layer 303 which are sequentially stacked on the substrate 10. The second electrode B includes a second transparent conductive layer 202 and a second transparent metal oxide layer 304 which are sequentially stacked on the substrate 10. The materials of the first transparent conductive layer 203 and the second transparent conductive layer 202 are the same; the materials of the first transparent metal oxide layer 303 and the second transparent metal oxide layer 304 are the same.

The first branch electrode A and the second branch electrode B are spaced apart by a width X. Widths of the first branch electrode A and the second branch electrode B may be the same or different, wherein the width is a cross-sectional section width. The cross-sectional shape of the first branch electrode A and the second branch electrode B may also be changed by adjusting the shape of the photoresist layer. The cross-sectional shape of the first branch electrode and the second branch electrode includes a rectangle, a parallelogram, or other shape; wherein the cross section is a plan view cross section.

In this embodiment, the pixel electrode further includes a pixel frame structure and/or a pixel trunk structure, the first branch electrode is connected to the pixel frame structure and/or the pixel trunk structure, and the second branch electrode is connected to the pixel frame structure and/or the pixel trunk structure. The pixel frame structure and/or the pixel trunk structure may appear a cross shape or a pozidriv shape. Correspondingly, the pixel frame structure and/or the pixel trunk structure of different shapes form multiple regions in the pixel region, and each of the regions may provide with the first branch electrode and the second branch electrode disposed alternately and at an interval. The branch electrode is provided with a certain angle α between the pixel frame and/or the pixel trunk, and the angle α may be 0<α<180°. Specifically, the line arrangement between the pixel electrode and the display panel is not limited in the embodiment.

First Embodiment

A pixel electrode, which can be seen in FIG. 10, includes a substrate 10, and multiple branch electrodes disposed on a pixel region of the substrate 10, the multiple branch electrodes including a first electrodes A and a second electrode B alternately spaced, and the first and second electrodes are the same size and shape. Each of the branch electrodes includes a transparent ITO layer and a transparent aluminum oxide layer which are sequentially laminated on the substrate. Wherein, the interval between the first branch electrode A and the second branch electrode B which are alternately spaced is 1 μm. The first branch electrode and the second branch electrode have a width of 3 μm.

It should be noted that those skilled in the art to which the invention pertains may also make changes and modifications to the embodiments described above. Therefore, the present invention is not limited to the specific embodiments disclosed and described, and the equivalents and modifications of the present invention are intended to be included within the scope of the appended claims. In addition, although some specific terms are used in the specification, these terms are merely for convenience of description and do not impose any limitation on the present invention.

What is claimed is:

1. A pixel electrode, comprising:
   a substrate; and
   multiple branch electrodes disposed on a pixel region of the substrate;
   wherein the multiple branch electrodes includes a first branch electrode and a second branch electrode which are alternately spaced, the first branch electrode includes a first transparent conductive layer and a first transparent metal oxide layer which are sequentially stacked on the substrate, the second branch electrode includes a second transparent conductive layer and a second transparent metal oxide layer which are sequentially stacked on the substrate; and
   wherein the first branch electrode is formed of the first transparent metal oxide layer directly disposed on and in direct contact with a surface of the first transparent conductive layer and the second branch electrode is formed of the second transparent metal oxide layer directly disposed on and in direct contact with a surface of the second transparent conductive layer, wherein each of the first branch electrode and the second branch electrode is formed of multiple layers and each of the multiple layers includes a transparent material.

2. The pixel electrode according to claim 1, wherein a width between the first branch electrode and the second branch electrode is a distance X.

3. The pixel electrode according to claim 2, wherein the distance X is 0.2 μm~10 μm.

\* \* \* \* \*